(12) United States Patent
Andreasen

(10) Patent No.: US 9,237,605 B2
(45) Date of Patent: Jan. 12, 2016

(54) HEAT LAMP

(71) Applicant: Future Farming Holding ApS, Holsted (DK)

(72) Inventor: Karin Susanne Due Andreasen, Holsted (DK)

(73) Assignee: Future Farming Holding APS, Holsted (DK)

(*) Notice: Subject to any disclaimer, the term of this patent is extended or adjusted under 35 U.S.C. 154(b) by 0 days.

(21) Appl. No.: 14/222,073

(22) Filed: Mar. 21, 2014

(65) Prior Publication Data

US 2014/0202394 A1 Jul. 24, 2014

Related U.S. Application Data

(63) Continuation of application No. PCT/DK2012/000104, filed on Sep. 20, 2012.

(30) Foreign Application Priority Data

Sep. 26, 2011 (DK) .................................. 2011 00735

(51) Int. Cl.
| | |
|---|---|
| *A01K 1/02* | (2006.01) |
| *H05B 3/00* | (2006.01) |
| *A01K 31/19* | (2006.01) |
| *F24C 7/06* | (2006.01) |
| *H05B 3/48* | (2006.01) |

(52) U.S. Cl.
CPC .............. *H05B 3/008* (2013.01); *A01K 1/0218* (2013.01); *A01K 31/19* (2013.01); *F24C 7/065* (2013.01); *H05B 3/0033* (2013.01); *H05B 3/48* (2013.01); *H05B 2203/032* (2013.01)

(58) Field of Classification Search
CPC ... H05B 3/48; H05B 3/0033; H05B 2203/032
USPC ......... 119/308, 309, 310, 318, 319, 320, 445, 119/448; 313/263, 264, 318.11, 323, 324, 313/331, 356; 219/544
See application file for complete search history.

(56) References Cited

U.S. PATENT DOCUMENTS

| | | | | |
|---|---|---|---|---|
| 2,277,697 | A * | 3/1942 | Grier ................................ | 362/10 |
| 2,795,724 | A * | 6/1957 | Beeson ................. | H01J 61/547 |
| | | | | 313/318.02 |
| 3,139,881 | A * | 7/1964 | Fannon, Jr. .................. | 126/92 R |
| 4,348,986 | A * | 9/1982 | Marrs ........................... | 119/508 |
| 4,390,125 | A * | 6/1983 | Rozzi .............................. | 237/70 |
| 4,766,524 | A * | 8/1988 | Ogawa .............. | G02F 1/133604 |
| | | | | 362/216 |
| 4,916,580 | A * | 4/1990 | Sano ...................... | G01D 11/28 |
| | | | | 362/216 |

(Continued)

*Primary Examiner* — Rob Swiatek
*Assistant Examiner* — Ebony Evans
(74) *Attorney, Agent, or Firm* — Adam J. Cermak; Cermak Nakajima & McGowan LLP

(57) ABSTRACT

An electrical heat lamp for pig breeding includes a housing and an electrical heating source. The heating source is a U-shaped, infrared electromagnetic radiation heating element, and includes an electric member portion for connecting to an external electric energy source. The heat lamp includes a reflector arranged in the housing, the reflector being adapted to reflect the electromagnetic radiation emitted from the heating source, is adapted to fit the shape of the heating source, and has a U-shaped groove which in turn has a parabolic cross section. The heat lamp includes a sealing member sealing the space or electrical connection between the heating source and the electric member portion against water; optionally, one or two more sealing members are provided.

13 Claims, 7 Drawing Sheets

(56) References Cited

U.S. PATENT DOCUMENTS

| | | | |
|---|---|---|---|
| 5,079,681 A * | 1/1992 | Baba | F21V 13/04 313/15 |
| 5,107,792 A * | 4/1992 | Bugl et al. | 119/448 |
| 5,429,112 A * | 7/1995 | Rozzi | 126/116 A |
| 5,608,288 A * | 3/1997 | Haag | H01J 61/025 313/612 |
| 6,637,374 B2 * | 10/2003 | Hawks et al. | 119/448 |
| 8,656,904 B2 * | 2/2014 | Wortman et al. | 126/91 A |

* cited by examiner

HEAT LAMP

This application is a Continuation of, and claims priority under 35 U.S.C. §120 to, International Application No. PCT/DK2012/000104, filed 20 Sep. 2012, which claims priority under 35 U.S.C. §§119, 365 to Danish App. No. PA 2011 00735, filed 26 Sep. 2011, the entireties of which are incorporated by reference herein.

BACKGROUND

1. Field of Endeavor

The invention generally relates to a heat lamp. The invention more particularly relates to an electrical heat lamp for pigs, especially for small pigs and/or pig breeding.

2. Brief Description of the Related Art

It is well known that new born and very young pigs require heat in order to thrive and grow. Therefore, heat lamps have been developed for the pig farrowing industry with the purpose of keeping new born and young pigs warm.

In traditional farrowing operations, it is desirable to heat, at least a part of, the box areas. A common method is to suspend a heat lamp over the box areas.

Prior art heat lamps for pigs typically use bulbs to generate heat, and when the box area is cleaned with the use of water, each heat lamp has to be removed from the box area. After the cleaning process the heat lamps have to be put back in place. This is a time consuming process and the heat lamps may be damaged during this process. Accordingly, it is desirable to have an alternative to these heat lamps.

The prior art heat lamps for pigs provide a rather inhomogeneous heat distribution. Thus, it is typically very hot in a small, basically circular, area below the heat lamp. On the other hand, the temperature is a decreasing function of the distance to the centum of the hot area. Accordingly, the optimum temperature is only present in a restricted area. Therefore, it is often very difficult for the pigs to find a comfortable place to stay.

SUMMARY

Accordingly, one of numerous aspects of the present invention includes a heat lamp that provides a homogeneous heat distribution.

Yet another aspect includes a heat lamp that can be cleaned with water.

A further aspect includes a heat lamp that is robust and less sensitive to vibrations and impact than the prior art heat lamps.

An additional aspect includes use of such a heat lamp in a pig stable.

Yet another aspect includes an electrical heat lamp which comprises a housing and an electrical heat source. The heating source is a U-shaped infrared electromagnetic radiation heating element and the heat lamp comprises electric member portions for connecting to an external electric energy source. Furthermore, the heat lamp comprises a reflector arranged in the housing, said reflector being adapted to reflect the electromagnetic radiation emitted from the heating source; said reflector is adapted to fit the shape of the heating source, and said reflector having a U-shaped groove which in turn is having a parabolic cross section. Additionally, the heat lamp comprises a sealing member sealing the space or electrical connection between the heating source and the electric member portion against water, thereby making the heat lamp washable. The heat lamp may optionally comprise one or two more sealing members.

It is a major advantage that the heat lamp is washable because, then the heat lamps can, during the cleaning of the stall, be kept stationary at the place, where the heat lamps are installed.

The use of an infrared electromagnetic radiation heating element as heating source ensures, that the heat lamp provides a homogeneous heat distribution and hereby provides comfortable conditions for the pigs.

Another aspect includes a heat lamp which is robust and less sensitive to vibrations and impact than the prior art heat lamps.

The reflector ensures that the heat lamp is capable of reflecting rays towards the pigs in a homogeneous manner, in which the reflected rays are extending basically parallel to each other and perpendicular to the longitudinal axis of the housing. In this way a very homogeneous heating can be provided.

The reflector is adapted to fit the shape of the heating source and that the reflector has a U-shaped groove having a parabolic cross section.

Hereby, it is achieved that the reflector can reflect the rays emitted from the heating source all the entire extension of the heat source. Thus, an efficient utilization of the heat can be achieved.

By the term washable is meant, that the heat lamp is sealed in such a way, that it is adapted to be hosed, without damaging the heat lamp.

This means that all electrical parts of the heat lamp are sealed in such a way that the water from the hose process cannot reach these parts.

The heating source can be any suitable infrared electromagnetic radiation heating element. Preferable, the infrared electromagnetic heating element is adapted to be used in a room with air.

Infrared electromagnetic radiation heating elements are advantageous, because they do not heat up the air, but only the objects and animals that are affected by the heat rays. Therefore, in comparison with bulb type heat lamps, the infrared electromagnetic radiation heating elements are more cost efficient in use.

Advantageously, the heat lamp comprises an open elongated and basically box-shaped housing having a longitudinal axis and the U-shaped heating source extending parallel to the longitudinal axis of the housing.

Hereby, it is possible to achieve a compact heat lamp that provides a desirable heating, and only takes up little space.

Beneficially, the housing has a length that is more than twice as long as the width of the housing and the thickness of the heat lamp is less than half, preferable less than a third of the width of the housing. Such geometry makes it possible to provide a very compact heat lamp.

A box or an electric member portion is integrated in the housing and this box or the electric member portion comprises an electrical connection between the heating element and a cable for connection to an external electrical energy source. In this way, it is possible to provide a compact heat lamp, in which the critical electrical connections are sealed.

It may be an advantage that the box or the electric member portion comprises a casting compound for encapsulating and/or coating the electric or electronic components in the box or the electric member portion and that the box or the electric member portion is integrated in the housing and that the box or the electric member portion comprises an electrical connection between the heating element and a cable for connection to an external electrical energy source. The casting compound may be based on epoxy resins, however, any suitable casting compound that can provides an efficient and reliable sealing of the heat lamp may be used.

Preferable, the heat lamp is adapted to be connected to the mains. However, it is possible to use another electrical source, e.g., a battery.

It is preferred that a light source configured to emit visible light is integrated in the housing. The light source is capable of attracting the pigs. Accordingly, the light source can make the pigs come closer to the heat lamp.

According to principles of the present invention, the reflector is integrated in the housing. It is possible to have a heat lamp in which the housing and the reflector is a one piece body, e.g., made of fibre reinforced plastic or stainless steel, such as acid proof stainless steel.

It is an advantage that the housing comprises a back side that is completely closed. The closed back side ensures a complete sealing of the back side area of the heat lamp. Accordingly, the sealing contributes to the water resistance of the heat lamp. When the back side of the heat lamp is sealed, the back side will be washable.

Preferable, the heat lamp comprises means for regulating the power of the heat lamp. Preferable, the heat lamp comprises means for selecting between fixed power levels, in particular in the range of 0% and/or 25% and/or 50% and/or 75% and/or 100% of the maximum power of the heat lamp.

Preferable, the heat lamp comprises means for gradually decreasing the power of the heat lamp as a function of time. Preferable, the means for gradually decreasing the power of the heat lamp as a function of time by using a step function, preferable a step function, in a first power level is fixed for a number of hours or a day or several days and where a second lower power level is fixed for a number of hours or a day or several days.

It may beneficial that the housing comprises a reflector and that there is provided a gap between the reflector and the periphery of the housing. The heat that is transmitted through the reflector may escape through the gap. In this way, a part of the heat that is "lost" through transmission of heat through the reflector may be redirected towards the object (the pigs) that the heat lamp is intended to warm.

Advantageously, a mesh is attached to the housing. The mesh shields the heating source from bedding (straw).

The heat lamp may be configured in such a way, that the heating source and/or the reflector and/or other parts of the heat lamp can be detached and replaced. Hereby, the heat lamp can easily be replaced.

It may be an advantage that the reflector is provided with one or more holes. The heat that is transmitted through the reflector may escape through the hole(s). Accordingly, heat may be redirected towards the pigs that the heat lamp is intended to warm.

Preferable, the housing is made of stainless steel, such as acid proof stainless steel or of plastic.

It is possible to have a light source as a separate part electrically connected to the heat lamp. The light source may be arranged in a separate housing that is electrically connected to the heat lamp by a cable.

Since the heating source is an infrared electromagnetic radiation heating element, the heating source is capable of transferring energy (electromagnetic radiation) to a body (pigs) with a lower temperature than the heating source. Depending on the temperature of the heat source, the wavelength of the infrared radiation may range from 780 nm to about 1 mm.

The heat lamp is a heat lamp suitable for pig breeding.

Accordingly, yet another aspect relates to the use of an electrical heat lamp in a pig stable.

In one embodiment this use may be for pig breeding.

BRIEF DESCRIPTION OF THE DRAWINGS

The invention will become more fully understood from the detailed description given herein below. The accompanying drawings are given by way of illustration only, and thus, they are not limitative of the present invention. In the accompanying drawings.

DETAILED DESCRIPTION OF EXEMPLARY EMBODIMENTS

Figure 1:
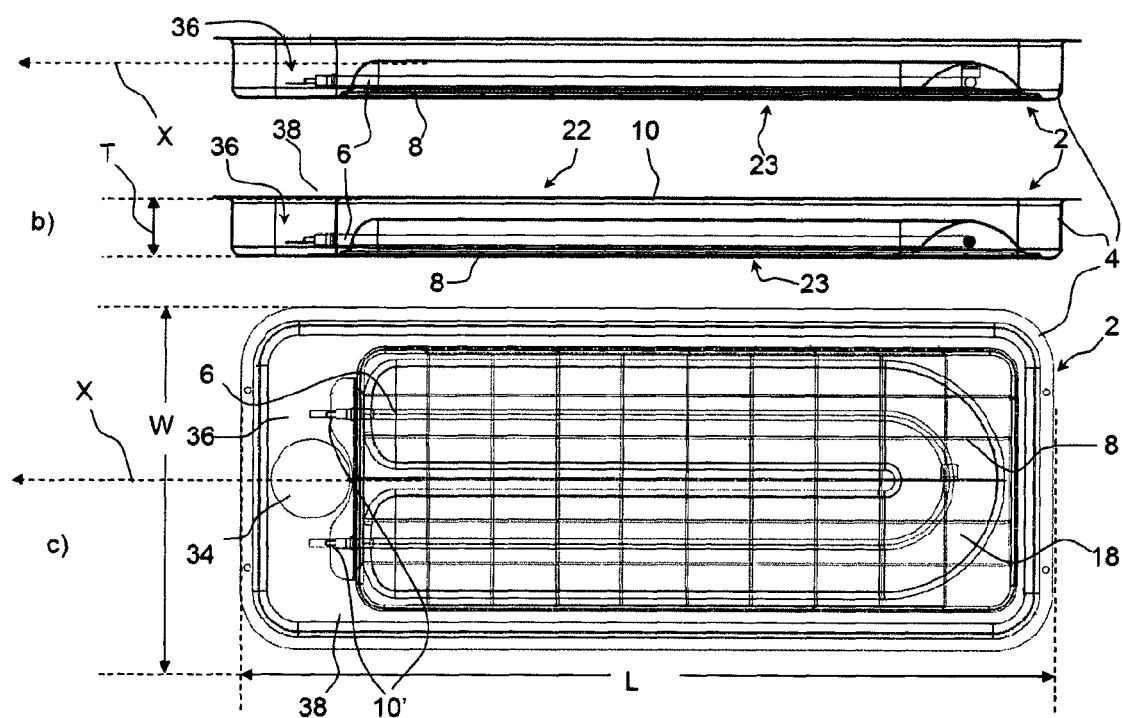
FIG. 1 shows three different views of a heat lamp according to the invention.

Referring now in detail to the drawings for the purpose of illustrating preferred embodiments of the present invention, a heat lamp 2 of the present invention is illustrated in FIG. 1. FIG. 1a) and FIG. 1b) each show a side view, while FIG. 1c) shows a front view of one embodiment, of a heat lamp 2 according to the invention. The housing 4 of the heat lamp 2 is basically box-shaped. The housing 4 has a length L that is more than twice as long as the width W of the housing 4, and the thickness T of the heat lamp 2 is less than a third of the width W of the housing 4. Thus, the heat lamp 2 is very compact.

The heat lamp 2 has a front side 23 and a back side 22. The front side 23 of the heat lamp 2 is open, and therefore rays, in the form of infrared electromagnetic radiation, from the heating source 6 can radiate towards the pigs that are intended to be heated by using the heat lamp 2.

The heat lamp 2 has a longitudinal axis X and the heating source 6 is a U-shaped heating element extending parallel to the longitudinal axis X of the heat lamp 2. A mesh 8 attached to the housing 4 at the front side 23 of the housing 4. The mesh 8 shields the heating source 6 from bedding (e.g. straw that is present in the stall).

The heat lamp 2 includes a reflector 18 that fits the shape of the heating source 6. The reflector 18 has a U-shaped groove 28 having a parabolic cross section. The U-shaped groove 28 of the reflector 18 extends along the U-shaped heating source 6 and the reflector 18 is configured to reflect the rays from the heating source 6 so that the rays reflected by the reflector 18 is being directed towards the pigs. The reflector 18 may be made of any suitable reflecting material, e.g., stainless steel, such as acid proof stainless steel.

At the free end side 38 of the heating source 6 an electric member portion 36 is integrated in the housing 4 of the heat lamp 2. The electric member portion 36 includes a connection between the heating source 6 and the external electrical energy source (not shown), such as the mains, that the heat lamp 2 is intended to be connected to.

A light source 34 emitting visible light is integrated in the electric member portion 36 of the housing 4. The light source 34 is capable of attracting the pigs. The light source 34 is used to make the pigs come closer to the heat lamp 2.

Moreover, the heat lamp 2 includes a first sealing member 10 sealingly covering the back side 22 of the heat lamp. The heat lamp 2 further includes a second sealing member 10' that is sealing the space or electrical connection between the heating source 6 and the electric member portion 36 against water. The first sealing member 10 is a casting compound for encapsulating and sealing the back side 22 heat lamp 2. The casting compound may be may be based on epoxy resins, however, any other suitable casting compound that can provides an efficient and reliable sealing of the heat lamp 2 may be used. It is an advantage that the housing 2 includes a completely closed back side 22. The closed back side 22 ensures a complete sealing of the back side 22 area of the heat lamp 2. Hereby, a very reliable and energy efficient heat lamp 2 can be achieved.

FIG. 2a illustrates two perspective views of a heat lamp 2 according to principles of the invention. FIG. 2a) is a perspective front view of the heat lamp 2, while FIG. 2b) shows a perspective view of the back side 22 of the heat lamp 2.

Figure 2:
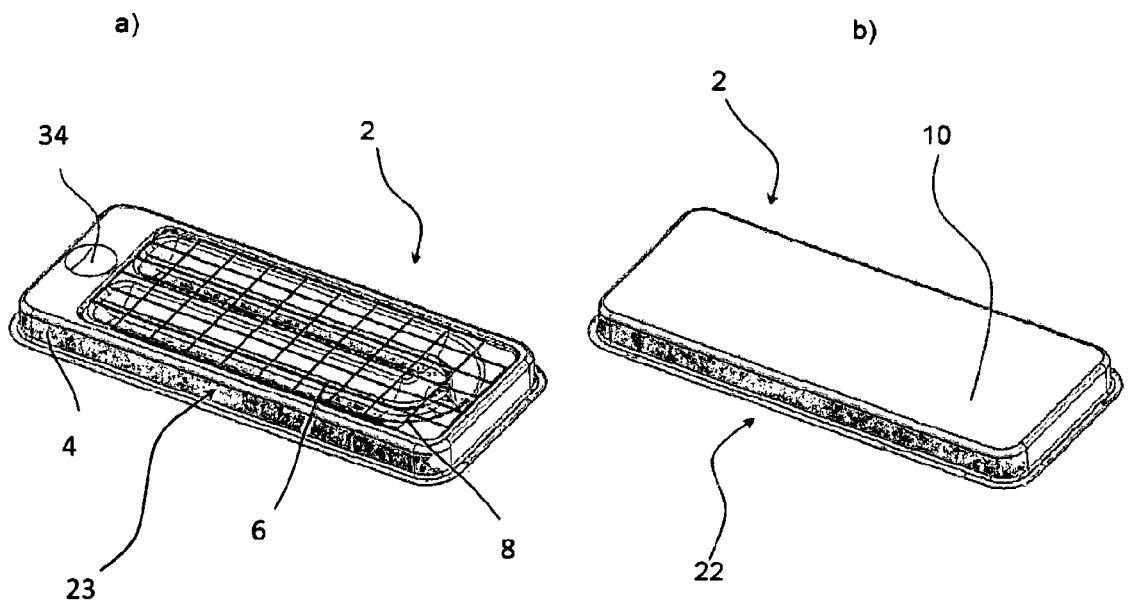
FIG. 2 shows two perspective views of a heat lamp according to the invention.

In FIG. 2 it can be seen that the heat lamp 2 has a basically box-shaped housing 4, and that it provided with a light source 34 arranged near the free end 38 of the heating source 6.

A mesh 8 is attached to the housing 4 at the front side 23 of the housing 4. The mesh 8 may be made of any suitable material, e.g., stainless steel, such as acid proof stainless steel or fibre reinforced plastic. The mesh 8 shields the heating source 6, and the mesh 8 hereby prevents objects from coming close to the heating source 6.

In FIG. 2b) it can be seen, that the heat lamp 2 includes a first sealing member 10 sealingly covering the back side 22 of the heat lamp 2. The first sealing member 10 is preferable a casting compound for encapsulating and sealing that prevents water from entering the housing 4 from its back side 22. Accordingly, the heat lamp 2 is washable.

Figure 3:
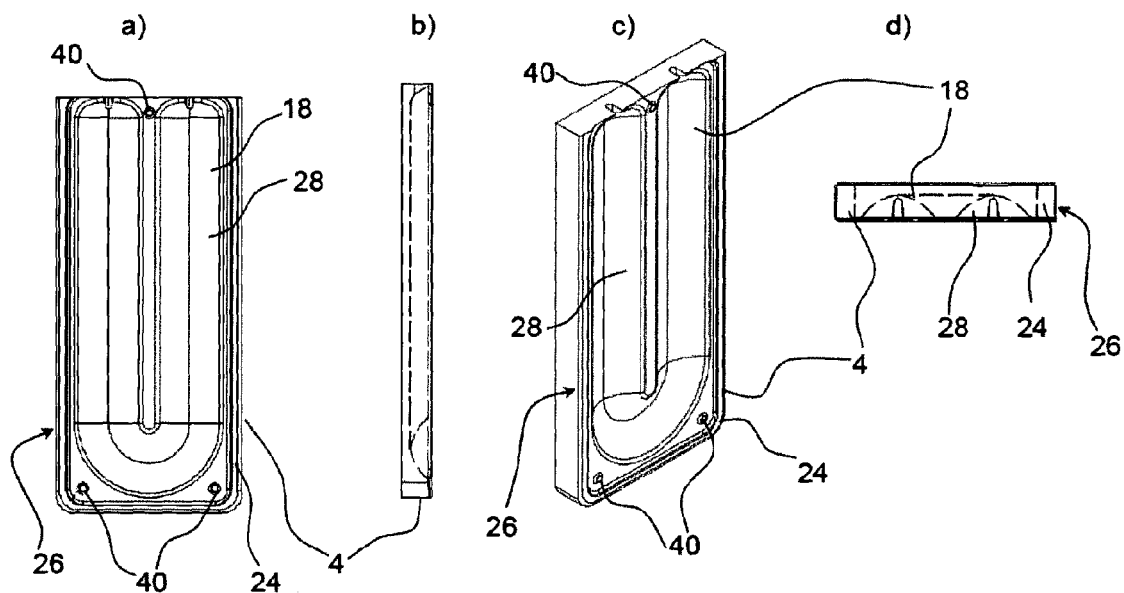
FIG. 3 shows four different views of a housing of a heat lamp according to the invention.

FIG. 3 illustrates four different views of a reflector 18 arranged in a housing 4 according to principles of the invention. The reflector 18 is configured to receive a U-shaped heating source (see FIG. 2-3). Since the reflector 18 is adapted to fit the shape of the heating source 6, it has a U-shaped groove 28 having a parabolic cross section.

The reflector 18 is attached to the housing 4 by three screws 40. A gap 24 extends all the way between the reflector 18 and the periphery 26 of the housing 4. The heat that is transmitted through the reflector 18 can escape through the gap 24 so that a part of the heat that is "lost" through transmission of heat through the reflector may be redirected towards the pigs.

Figure 4:
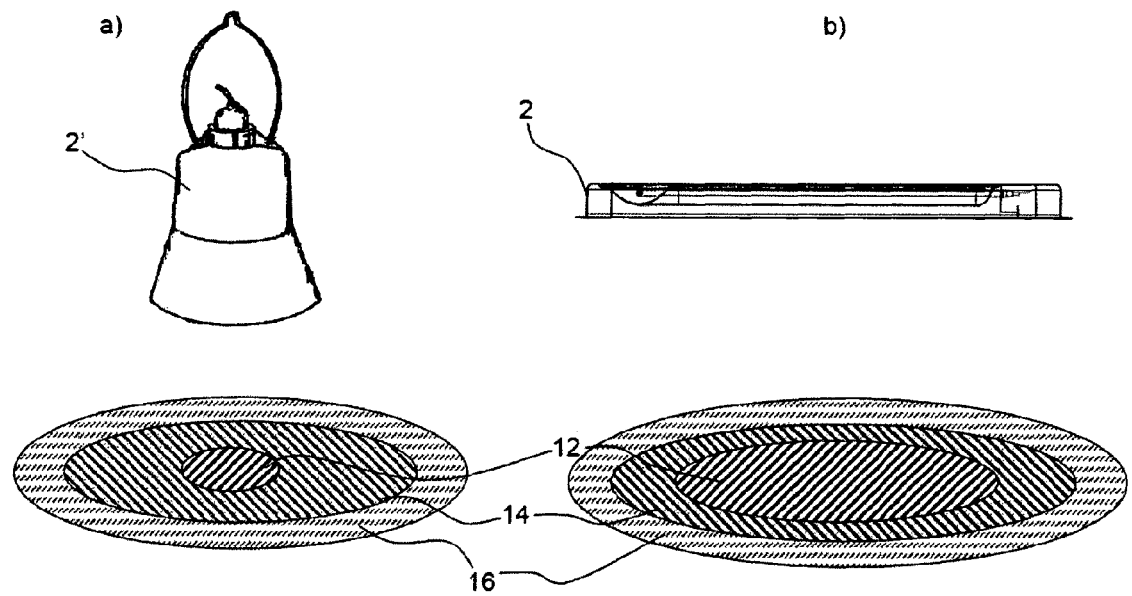
FIG. 4 shows the heat distribution of a prior art heat lamp compared with the heat distribution of a heat lamp according to the invention.

FIG. 4 illustrates the heat distribution of a prior art heat lamp 2' and a heat lamp 2 according to principles of the invention. The heat lamps 2 are suspended at the same distance from a floor. The prior art heat lamp 2' provides a small basically circular area high temperature area 12 surrounded by a larger medium temperature area 14 that is surrounded by a low temperature area 16. The prior art lamp 2' provides a rather small high temperature area 12. Since the temperature in the high temperature area 12 is intended to provide an optimum comfort level for the pigs, the limited size of the high temperature area 12 is a problem.

In FIG. 4b) it can be seen that the heat lamp 2 according to the present invention provides a much larger (basically circular) high temperature area 12 than the prior art heat lamp 2'. The high temperature area 12 is surrounded by a medium temperature area 14 of a smaller size and the medium temperature area 14 is surrounded by a low temperature area 16.

Compared to the prior art lamp 2', the heat lamp 2 according to principles of the invention provides much larger high temperature area 12 and the temperature is more homogeneously distributed. Accordingly, the heat lamp 2 is configured to provide the optimum comfort level for the pigs.

Figure 5:
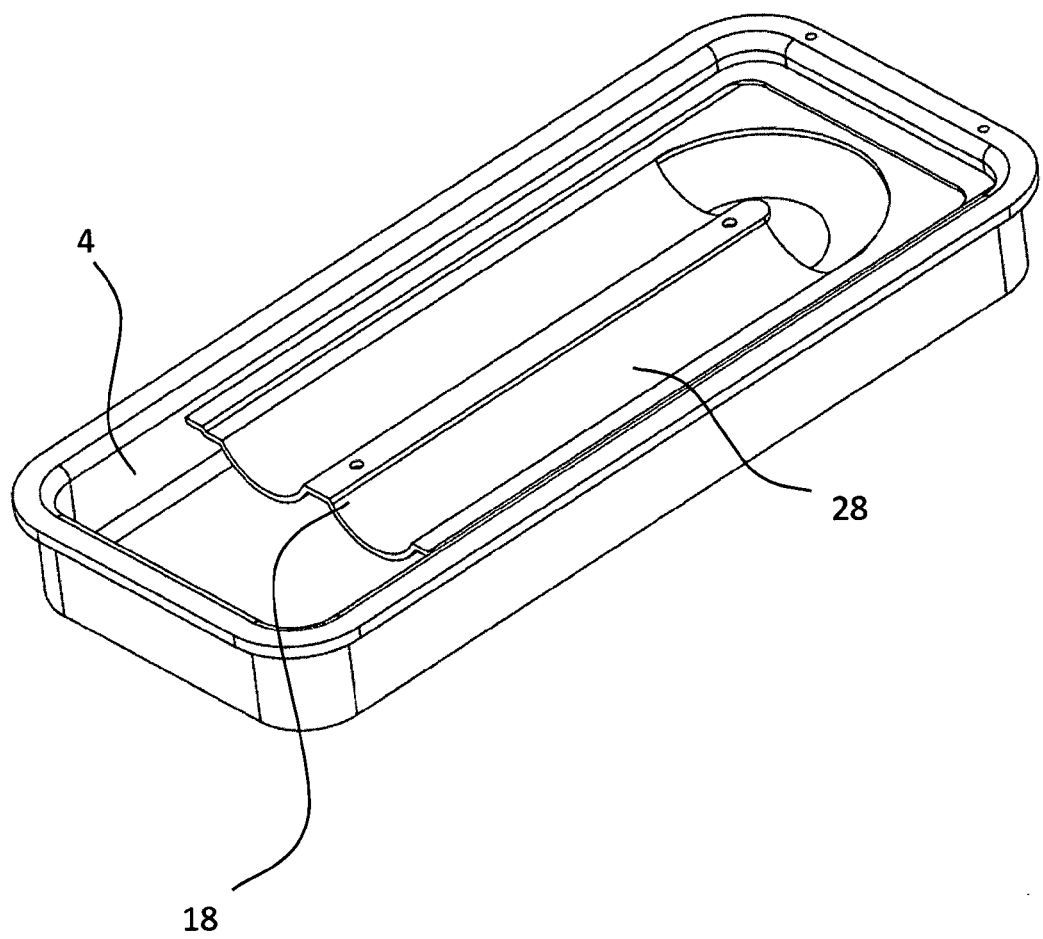
FIG. 5 shows a perspective view of a housing of a heat lamp according to the invention and FIG. 6 shows the back side of a housing of a heat lamp according to the invention.

FIG. 5 illustrates a perspective view of a housing 4 and a reflector 18 according to principles of the invention. The reflector 18 is configured to receive a U-shaped heating source 6 like the one shown in FIG. 1 and FIG. 2. The reflector 18 has a U-shaped groove 28 having a parabolic cross section. Like in FIG. 1 and FIG. 2, the U-shaped groove 28 of the reflector 18 is intended to extend along the U-shaped heating source 6. Hereby, the reflector 18 is can reflect the rays from the heating source 6 so that the rays are directed towards the pigs.

Figure 6:
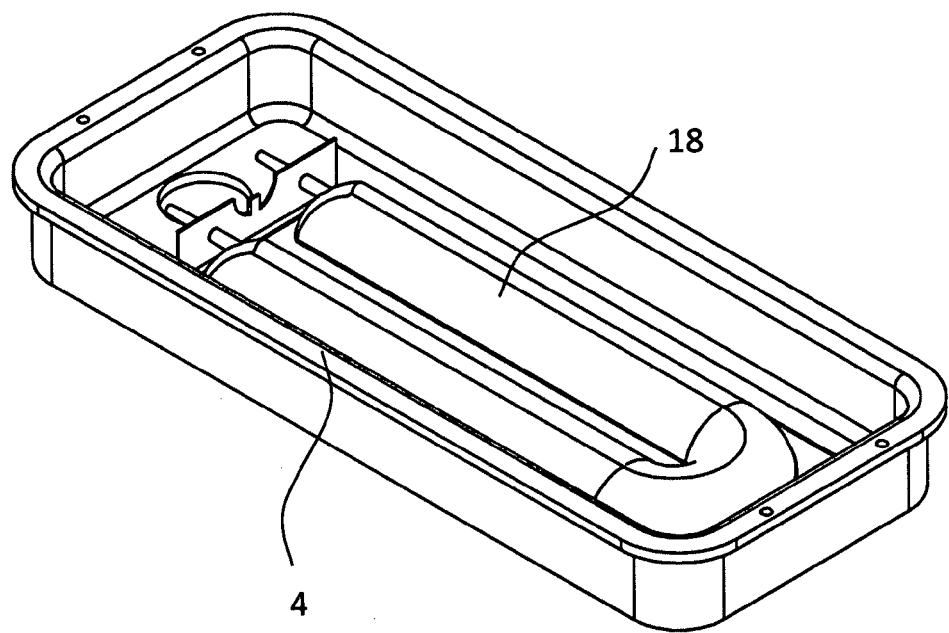

FIG. 6 illustrates a perspective back side view of a housing 4 of a heat lamp according to principles of the invention. A reflector 18 is integrated in the housing 4. The reflector is U-shaped and it has a parabolic cross section. An isolating sealing member is intended to be provided at the back side of the housing 4 like illustrated in FIG. 2).

All the shown embodiments of the heat lamp 2 may be arranged vertically, horizontally, or in any other suitable orientation.

Even though it is not indicated at any of the drawings, the heat lamp 2 may be equipped with devices for being suspended over the box areas.

Figure 7:
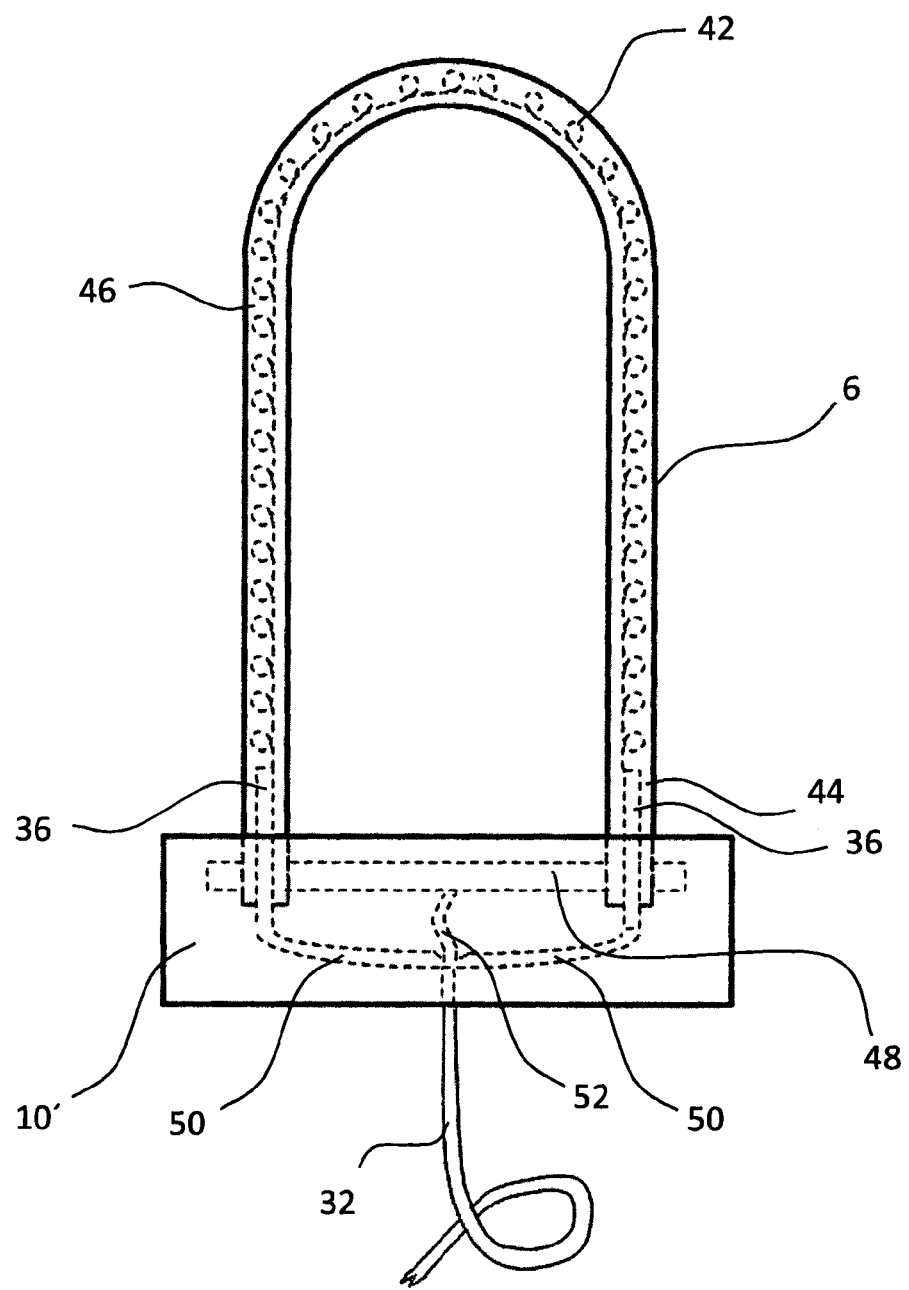
FIG. 7 shows a heat source suitable for use with the heat lamp according to the invention.

FIG. 7 shows a heating source 6 used according to principles of the present invention. The heating source 6 includes a U-shaped tube. The tube is made of metal or an alloy, such as steel, such as stainless steel, for example acid proof stainless steel. Inside the U-shaped tube is arranged a heating wire 42. The heating wire 42 extends inside the tube in a helical manner. The heating wire is electrically isolated from the inside walls of the U-shaped tube by being suspended in a powdered ceramic material 46, such as silicon dioxide or sand. The heating wire 42 is in each end electrically connected to an electric member portion 36, which in turn is electrically connected to the current bearing lead 50 of the cable 32. The electric member portion 36 is fastened in the U-shaped tube by an electrically isolating resin 44. An earthed lead 52 of the cable 32 is electrically connected to an earthed bridge 48, which in turn is electrically connected to the outer surface of the U-shaped tube. The two ends of the U-shaped tube are cast into a sealing member 10' of e.g. polyurethane.

Such a design of the heat lamp according to principles of the invention makes the heat lamp fully resistant against damages caused by water, especially against damages to the electrical elements of the lamp.

LIST OF REFERENCE NUMERALS 2, 2'—Heat lamp
4—Housing
6—Heat source
8—Mesh
10, 10', 10"—Sealing member
12—High temperature area
14—Medium temperature area
16—Low temperature area
X—Longitudinal axis of the housing
18—Reflector
20—Electromagnetic radiation
22—Back side
23—Front side
24—Gap
26—Periphery of the housing
28—U-shaped groove 30—Box
32—Cable
34—Light source
36—Electric member portion
38—Free end of the heating source
40—Fastening means
42—Heating wire
44—Heat isolation resin
46—Electrically isolating powdered ceramic material
48—Earthed bridge
50—Current bearing lead of cable
52—Earthed lead of cable While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

I claim:

1. An electrical heat lamp useful for pig breeding, the lamp comprising:
    a housing and an electrical heating source, wherein the heating source comprises a U-shaped, infrared electromagnetic radiation heating element;
    wherein said heating source comprises an electric member portion configured to connect to an external electric energy source;
    a reflector arranged in the housing, said reflector being adapted to reflect the electromagnetic radiation emitted from the heating source, said reflector being adapted to fit the shape of the heating source, and said reflector having a U-shaped groove with a parabolic cross section; and
    a sealing member sealing the electrical connection between the heating source and the electric member portion against water;
    wherein the heating source comprises a U-shaped tube having two ends, and said two ends of the U-shaped tube are cast into the sealing member.

2. An electrical heat lamp according to claim 1, wherein:
    said housing is open, elongated, and box-shaped with a longitudinal axis; and
    wherein said U-shaped tube extends parallel to the longitudinal axis of the housing.

3. An electrical heat lamp according to claim 2, wherein the housing has a length (L) that is more than twice as long as a width (W) of the housing, and a thickness (T) of the heat lamp is less than half of the width (W) of the housing.

4. An electrical heat lamp according to claim 3, wherein the thickness (T) of the heat lamp is less than a third of the width (W) of the housing.

5. An electrical heat lamp according to claim 1, wherein the sealing member is configured and arranged to allow the heat lamp to be washable.

6. An electrical heat lamp according to claim 1, wherein a front side of the heat lamp is open so that infrared electromagnetic radiation rays when emitted from the heating source may radiate towards a pig without being absorbed.

7. An electrical heat lamp according to claim 1, further comprising:
    a box or an electric member portion integrated in the housing;
    a cable for connection to an external electrical energy source; and
    wherein the box or the electric member portion comprises an electrical connection between the heating element and the cable.

8. An electrical heat lamp according to claim 1, further comprising:
    a light source configured to emit visible light integrated in the housing.

9. An electrical heat lamp according to claim 1, wherein the housing comprises a back side that is completely closed.

10. An electrical heat lamp according to claim 1, comprising a gap between the reflector and a periphery of the housing.

11. An electrical heat lamp according to claim 1, further comprising:
    a mesh attached to the housing.

12. An electrical heat lamp according to claim 1, wherein the sealing member seals the electrical connection between the heating element and the electric member portion against water.

13. A method of using an electrical heat lamp in pig farrowing, the method comprising:
    providing an electrical heat lamp according to claim 1 in a pig stable;
    energizing said electrical heat lamp so that it emits infrared electromagnetic radiation rays; and
    permitting pigs in said pig stable to be exposed to said infrared electromagnetic radiation rays.

* * * * *